(12) United States Patent
Patey et al.

(10) Patent No.: US 9,729,548 B2
(45) Date of Patent: Aug. 8, 2017

(54) BIOMETRIC IDENTIFICATION USING FILTERS AND BY SECURE MULTIPART CALCULATION

(71) Applicant: MORPHO, Issy-les-Moulineaux (FR)

(72) Inventors: Alain Patey, Issy-les-Moulineaux (FR); Herve Chabanne, Issy-les-Moulineaux (FR); Julien Bringer, Issy-les-Moulineaux (FR); Melanie Favre, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/366,672

(22) PCT Filed: Dec. 20, 2012

(86) PCT No.: PCT/EP2012/076492
§ 371 (c)(1),
(2) Date: Jun. 18, 2014

(87) PCT Pub. No.: WO2013/092916
PCT Pub. Date: Jun. 27, 2013

(65) Prior Publication Data
US 2015/0007258 A1     Jan. 1, 2015

(30) Foreign Application Priority Data

Dec. 20, 2011 (FR) .................................. 11 62058

(51) Int. Cl.
| H04L 29/06 | (2006.01) |
| H04L 9/00 | (2006.01) |
| H04L 9/32 | (2006.01) |
| G06K 9/00 | (2006.01) |
| G09C 1/00 | (2006.01) |

(52) U.S. Cl.
CPC ...... H04L 63/0861 (2013.01); G06K 9/00087 (2013.01); G06K 9/00617 (2013.01);
(Continued)

(58) Field of Classification Search
CPC .............. H04L 63/0861; H04L 9/3231; G06K 9/00087; G06K 9/00617
See application file for complete search history.

(56) References Cited

U.S. PATENT DOCUMENTS 6,944,318 B1 *   9/2005   Takata et al. ................. 382/115
8,321,953 B2 *  11/2012   Jevans ............................ 726/27
(Continued)

FOREIGN PATENT DOCUMENTS

FR           2 957 168           9/2011

OTHER PUBLICATIONS

Opinion Ecrite Sur La Brevetabilite de l'Invention issued for FR 1162058 (11 pages).
(Continued)

*Primary Examiner* — Matthew Smithers
*Assistant Examiner* — Alexander Lapian
(74) *Attorney, Agent, or Firm* — Blakely Sokoloff Taylor & Zafman LLP

(57) ABSTRACT

The invention is about an identification process of an individual or object, in a system comprising a control server and a management server of a database comprising N indexed data of N stored individuals,
in which, to identify the individual or object, its datum is compared to each of the N data of the base. The process comprises steps during which:
the control server acquires the datum of the individual or object to be identified,
the reference data of the base and the datum of the individual or object to be identified are converted into simplified data of lesser size,
a set of p index of simplified data of the base, p being less than N, having the most similarities to the simplified datum of the individual or object to be identified,
(Continued)

securely between each of the N simplified data of the database and the simplified datum of the individual or object to be identified, the management server scrambles the N reference data of the database, and transfers to the control server p scrambled data corresponding to the simplified data identified previously, from the p scrambled data the control server determines, by secure multi-party computation between each of the p scrambled data and the datum of the individual or object, the index or the indices of one or more scrambled data whereof the corresponding reference data have a rate of similarity to the datum of the individual or object, which exceeds a predetermined threshold.

14 Claims, 7 Drawing Sheets

(52) U.S. Cl.
CPC .......... *G06K 9/00885* (2013.01); *G09C 1/00* (2013.01); *H04L 9/00* (2013.01); *H04L 9/008* (2013.01); *H04L 9/3231* (2013.01); *H04L 63/20* (2013.01); *H04L 2209/42* (2013.01)

(56) References Cited

U.S. PATENT DOCUMENTS

| | | | | |
|---|---|---|---|---|
| 2007/0180261 A1* | 8/2007 | Akkermans | ........ | G06K 9/00885 713/186 |
| 2009/0310830 A1* | 12/2009 | Bolle et al. | ................... | 382/124 |
| 2011/0211692 A1* | 9/2011 | Raykova | ................. | H04L 9/008 380/46 |
| 2011/0231667 A1* | 9/2011 | Kindarji et al. | .............. | 713/186 |

OTHER PUBLICATIONS

Opinion Ecrite de l'Administration Chargee de la Recherche Internationale issued for PCT/EP2012/076492 (14 pages).

English translation of International Preliminary Report on Patentability issued for PCT/EP2012/076492 (8 pages).

Bringer, J., et al., "Faster Secure Computation for Biometric Identification Using Filtering," *2012 5th IAPR International Conference on Biometrics (ICB)*,IEEE, Mar. 29, 2012, XP032215584, pp. 257-264.

Bringer, J., et al., "Extended Private Information Retrieval and Its Application in Biometrics Authentications," *Cryptology and Network Securty*, Dec. 8, 2007, XP019083964, pp. 175-191.

Blanton, M., et al., "Secure and Efficient Protocols for Iris and Fingerprint Identification," *International Association for Cryptologic Research*, vol. 20110917:024955, Sep. 17, 2011, XP061004601, pp. 1-25.

Bringer, J., et al., "Identification with Encrypted Biometric Data," URL: http://arxiv.org/pdf/0901.1062v2.pdf, retrieved Dec. 7, 2012, Sep. 7, 2009, XP055047128, pp. 1-27.

Sadeghi, A.-R., et al., "Efficient Privacy-Preserving Face Recognition," *Information, Security and Coptology A ICISC 2009*, Dec. 2, 2009, XP019147094, pp. 229-244.

Zeng, Z., et al., "Local Feature Hashing for Face Recognition," *IEEE 3rd International Conference on Biometrics: Theory, Application, and Systems, 2009*, Sep. 28, 2009, XP031570247, pp. 1-8.

Huang, Y., et al., "Efficient Secure Computation with Garbled Circuits," *Information Systems Security*, Jan. 1, 2011, XP019169391, pp. 28-48.

\* cited by examiner

| x | y | z |
|---|---|---|
| 0 | 0 | 0 |
| 0 | 1 | 0 |
| 1 | 0 | 0 |
| 1 | 1 | 1 |

| x | y | z |
|---|---|---|
| $k_0^x$ | $k_0^y$ | $k_0^z$ |
| $k_0^x$ | $k_1^y$ | $k_0^z$ |
| $k_1^x$ | $k_0^y$ | $k_0^z$ |
| $k_1^x$ | $k_1^y$ | $k_1^z$ |

| x | y | z |
|---|---|---|
| $k_0^x$ | $k_0^y$ | $Enc_{k_0^x, k_0^y}(k_0^z)$ |
| $k_0^x$ | $k_1^y$ | $Enc_{k_0^x, k_1^y}(k_0^z)$ |
| $k_1^x$ | $k_0^y$ | $Enc_{k_1^x, k_0^y}(k_0^z)$ |
| $k_1^x$ | $k_1^y$ | $Enc_{k_1^x, k_1^y}(k_1^z)$ |

| |
|---|
| $Enc_{k_1^x, k_1^y}(k_1^z)$ |
| $Enc_{k_0^x, k_0^y}(k_0^z)$ |
| $Enc_{k_1^x, k_0^y}(k_0^z)$ |
| $Enc_{k_0^x, k_1^y}(k_0^z)$ |

X'

MUX'

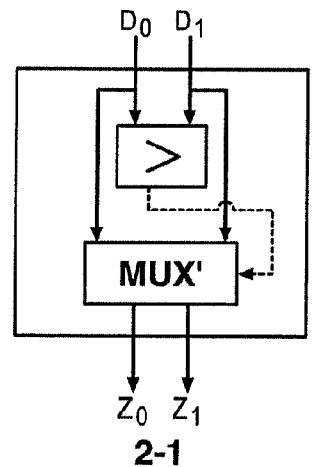
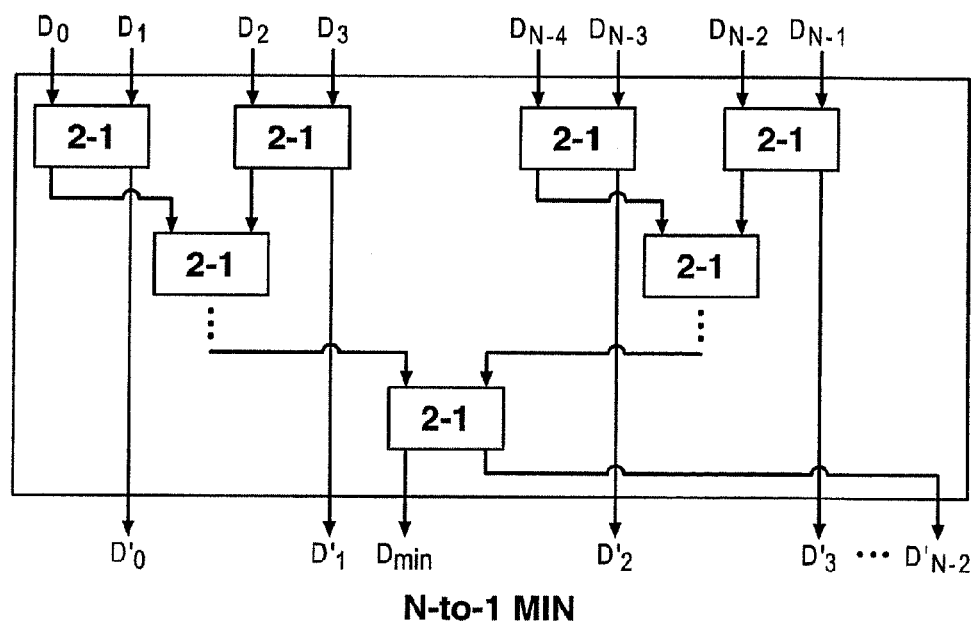

BIOMETRIC IDENTIFICATION USING FILTERS AND BY SECURE MULTIPART CALCULATION

FIELD OF THE INVENTION

The present invention relates in general to identification of individuals or objects, the identification being conducted by comparison of a datum of an individual or object to be identified to a set of data of the same kind of individuals or stored objects, these data being stored in a base.

The invention applies especially to the biometric identification of an individual, in which the compared data of the individual and the database are biometric information relating for example to the iris, fingerprint, or even face shape of the person.

STATE OF THE ART

Many identification techniques are already known. They are generally used jointly by a control server of an individual or object, which can undertake acquisition of a datum of an individual or object, and by a server of a base comprising N data of the same kind.

The datum of the individual or of the object, acquired by the control server, is compared to the set of data of the base to identify whether at least one datum of the base corresponds to the datum acquired, and accordingly identify the individual or the object as an individual or object stored in the base.

There are two major problems in this area, particularly in the case of biometric identification of individuals.

The first is linked to security and confidentiality of the identification process: indeed, the biometric database includes private information, and the control server must not have access to this information of the base. In the same way, the management server of the database must not collect information on the individual to be identified, in particular the biometric datum of the individual to be identified.

In response to this problem, secure computation systems have been developed. In particular, Secure Multi-Party Computation (SMC) is known, consisting of making a computation between several participants each holding one or more entries of a function to be calculated such that the participants learn, on completion of the computation, only the result of the computation.

Such systems are proposed in the following publications, for example:

Z. Erkin, M. Franz, J. Guajardo, S. Katzenbeisser, I. Lagendijk, and T. Toft. *Privacy-preserving face recognition*. In Privacy Enhancing Technologies, 2009.

A. C.-C. Yao. *How to generate and exchange secrets* (extended abstract). In FOCS, 1986.

A.-R. Sadeghi, T. Schneider, and I. Wehrenberg. *Efficient privacy-preserving face recognition*. In ICISC, 2009.

The second article describes a method of secure computation known as <<Yao protocol>>. This method is explained hereinbelow. The final article discloses a method utilising this Yao protocol in the context of biometric identification.

These methods lend considerable security to computation of comparison functions. However, they fail to respond to the second major problem: minimising time and computation capacity.

Indeed, secure computation applied N times to a complete biometric datum is very costly in computation time and number of data exchanged.

There is therefore a need to identify an individual from a biometric datum securely, and faster and less expensively in computational capacity than in solutions already proposed.

PRESENTATION OF THE INVENTION

The document by J. Bringer et al., *Extended Private Information Retrieval and Its Application in Biometrics Authentications*, in Cryptology and Network Security, Springer Berlin Heidelberg, 8 Dec. 2007 describes a protocol called EPIR and its application to computation of Hamming distance.

The document by M. Blanton et al., *Secure and Efficient Protocols for Iris and Fingerprint Identification*, in International association for cryptologic research, vol. 20110917, pages 1-25, 17 Sep. 2011, describes the use of garbled circuits and oblivious transfers for creating secure identification of an individual.

In this respect the invention proposes a secure identification process of an individual or object, by comparison with data from a database, which comprises a first phase of rapid and secure filtering to identify those data of the base having the most similarity to the datum of the individual or object, and a second step of secure computation for identifying the datum or data having a rate of similarity to the datum of the individual or object which exceeds a predetermined threshold.

The first step of rapid and secure filtering considerably curtails computational time as operations are conducted on data of reduced size relative to the original data. The second step, of secure computation, is performed on selected data only, and therefore comprises a number of computation operations less than the size of the original database (N).

The aim of the present application is an identification process of an individual or object, in a system comprising a control server, adapted to acquire a datum of the individual or object to be identified, and a management server of a database comprising N reference indexed data of N stored individuals, in which, to identify the individual or the object, his datum is compared to each of the N data of the base to determine if the datum of the individual or object to be identified corresponds to one of the N reference data of the N stored individuals.

The process comprises steps during which:

the control server acquires the datum of the individual or object to be identified, the reference data of the base and the datum of the individual or object to be identified are converted into simplified data of lesser size, a set of p index of simplified data of the base, p being less than N, having the most similarities to the simplified datum of the individual or object to be identified, is determined securely between each of the N simplified data of the database and the simplified datum of the individual or object to be identified, the management server scrambles the N reference data of the database, and transfers scrambled data corresponding to the simplified data identified previously to the control server p, from the p scrambled data, the control server determines, by secure multi-party computation between each of the p scrambled data and the datum of the individual or object, the index or the indices of one or more scrambled datum whereof the corresponding reference data have a rate of similarity to the datum of the individual or the object which exceeds a predetermined threshold.

Advantageously, though optionally, the process according to the invention comprises also at least one of the following characteristics:

The transfer of p scrambled data from the management server to the control server uses a technique of oblivious transfer.

During the process, after the control server has determined the index or the indices of scrambled data whereof the corresponding reference data have a rate of similarity to the datum of the individual or object which exceeds a predetermined threshold, the control server communicates said index to the management server, and from the index or the indices the management server determines the reference datum or the reference data of the base corresponding to said index or indices, and identifies the individual or the object as an individual or object stored in the base having the reference datum corresponding to the index or the indices.

To scramble the N data of the base, for each of the p reference data corresponding to the selected simplified data, the management server generates a corresponding scrambled database comprising N scrambled data for which, for each possible position of a bit in the binary representation of the corresponding data, a random permutation is applied to the bit of said position.

The identification relates to an individual, and the reference data of the base and the datum of the individual to be identified are biometric data.

The biometric data are binary codes of iris images.

Each datum comprises a set of indexed bits, and, during the step of conversion of data into simplified data, an indexation set comprising indexing numbers of bits of data is defined, and the data are converted by keeping for the simplified data only the bits that are indexed by the numbers of the indexation set, said indexing numbers being selected to relate to the most pertinent bits.

The simplified data of the base having the most similarities to the simplified datum of the individual or object are determined by computation of Hamming distances between the simplified data of the base and the simplified datum of the individual.

The determination step of N simplified data of the base having the most similarities to the simplified datum of the individual to be identified is performed by secure multi-party computation.

During the step of secure multi-party computation between the scrambled data of the base and the datum of the individual, a rate of similarity between each datum of the base corresponding to each scrambled datum and the datum of the individual is calculated, the rate of similarity obtained is compared at the predetermined threshold to select the index or the indices of the datum or the data of the base having a rate of similarity exceeding said threshold.

Each step of secure multi-party computation comprises the following sub-steps:
the management server generates at least one garbled circuit for computation of a function to be evaluated,
each garbled circuit having for input a set of encryption keys of bits of input data of the function to be evaluated and for output the encryption keys corresponding to the bits of the result of the evaluated function, and comprising steps of computation of the function decomposed in the form of elementary logical operations, and a set of coding keys of each of the possible inputs and outputs of each elementary logical operation,
the management server randomly generates said coding keys,
the management server communicates to the control server, by using a technique of oblivious transfer, for each garbled circuit, coding keys corresponding to the values of the bits of the inputs of the function to be evaluated, and a decoding table of the output of each garbled circuit or one or more outputs of a logical operation of the latter, and
from keys obtained, the control server evaluates each garbled circuit by using the obtained keys as input.

To compute and compare the rate of similarity between the data corresponding to the scrambled data and the datum of the individual, a secure multi-party computation is carried out, in which the management server generates, for each selected datum of the base, a corresponding garbled circuit,
the inputs of each garbled circuit being encryption keys of the corresponding scrambled datum and those of the datum of the individual,
the function to be evaluated of each garbled circuit being the computation of the rate of similarity between the corresponding datum of the base and the datum of the individual, and comparison of the rate of similarity to the predetermined threshold, and
the output of each circuit being the result of the comparison of the rate of similarity to the predetermined threshold,
in which the management server generates and transfers to the control server, for each garbled circuit, scrambled coding keys corresponding to the possible values of the bits of the scrambled datum and coding keys corresponding to the possible values of the bits of the datum of the individual, and transfers to the control server the values of the bits of the scrambled datum, and in which the transfers of the values of the bits of the scrambled datum and corresponding coding keys employ a method of oblivious transfer.

The function to be evaluated of each garbled circuit comprises the computation of the normalized Hamming distance between each datum corresponding to the scrambled datum and the datum of the individual.

Generation of the scrambled coding keys of a scrambled datum is performed by applying reindexation as per the same permutation as that applied to said bit of the datum to obtain the scrambled datum to coding keys generated randomly for each bit of the corresponding datum of the base.

In order to select the p simplified data of the base having the most similarities to the simplified datum of the individual to be identified, a method of secure multi-party computation is used in which the management server generates a garbled circuit,
the garbled circuit having for inputs the set of encryption keys of the bits of simplified data of the base and those of the simplified datum of the individual,
the function to be evaluated being the calculation of the rates of similarities between the simplified data of the base and the simplified datum of the individual followed by a search step of the p simplified data of the base having the most similarities to the simplified datum of the individual, the evaluation of the circuit allowing finding the index of the simplified data having the most similarities to the simplified datum of the individual.

The process comprises a preliminary step during which the data of the base are reindexed by the management server.

The invention also relates to an identification system of an individual, comprising at least one control server of an individual to be identified and at least one management server of a base of N reference data of stored individuals, the control server being adapted to proceed with acquisition of a datum of the individual, and in which the control server and the management server comprise processing means adapted for conducting secure filtering of p data among a set of N reference data of the base having the most similarities to the datum of the individual to be identified, and via secure computation identifying the datum or the data having similarities to the datum of the individual to be identified exceeding a predetermined threshold, without the control server obtaining information on the reference data stored in the database, or the management server obtaining information on the datum of the individual to be identified.

DESCRIPTION OF FIGURES

Other characteristics, aims and advantages of the present invention will emerge from the following detailed description with respect to the attached figures, given by way of non-limiting examples, and in which.

DETAILED DESCRIPTION OF AT LEAST ONE EMBODIMENT

Figure 1:
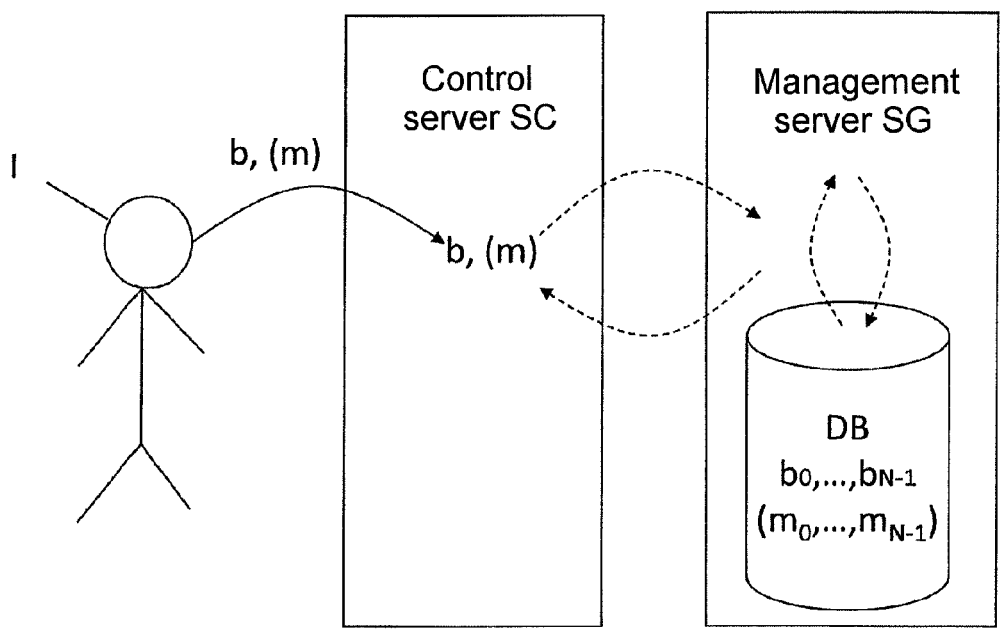
FIG. 1 schematically illustrates a system adapted for executing the process according to the invention.

In reference to FIG. 1, an embodiment of an identification of an individual I or object is schematically shown. This identification can for example be access control to a secure site. The non-limiting example of the biometric identification of an individual will be taken hereinbelow.

A database DB comprises a set of N indexed biometric data $b_i$, i being between 0 and N−1, of stored individuals as being for example authorised to enter a site, or on the contrary whose presence is prohibited on this site.

This database DB is linked to a management server SG, fitted with computation means executed by an appropriate computer program.

The individual I is identified with a control server SC, also fitted with computation means executed by an appropriate computer program, and also comprises means for acquisition and processing of a datum particular to the individual, especially a biometric datum b.

The datum b can originate as is known from a digitised and encoded image of a biometric character such as the face, or a fingerprint, or even the iris of the individual, or a combination of several of these data. By way of non-limiting example, the case of digital acquisition of the iris of the individual I will be taken hereinbelow.

The datum b can also be stored in digital form in an identity document of the individual.

The datum b of the individual and the data $b_0$ to $b_{N-1}$ of the base must be the same kind so as to be compared. In particular, the information they contain must relate to the same biometric characters: in the present example the iris.

In this case, the database DB can also comprise, for each datum of iris $b_i$, a corresponding mask code $m_i$, and the control server can also acquire a mask code m corresponding to the image of iris b, or process the datum b in light of obtaining them. These mask codes indicate the visible, and therefore exploitable, zones of the iris, these zones being typically those not masked by the eyelids.

Figure 5:
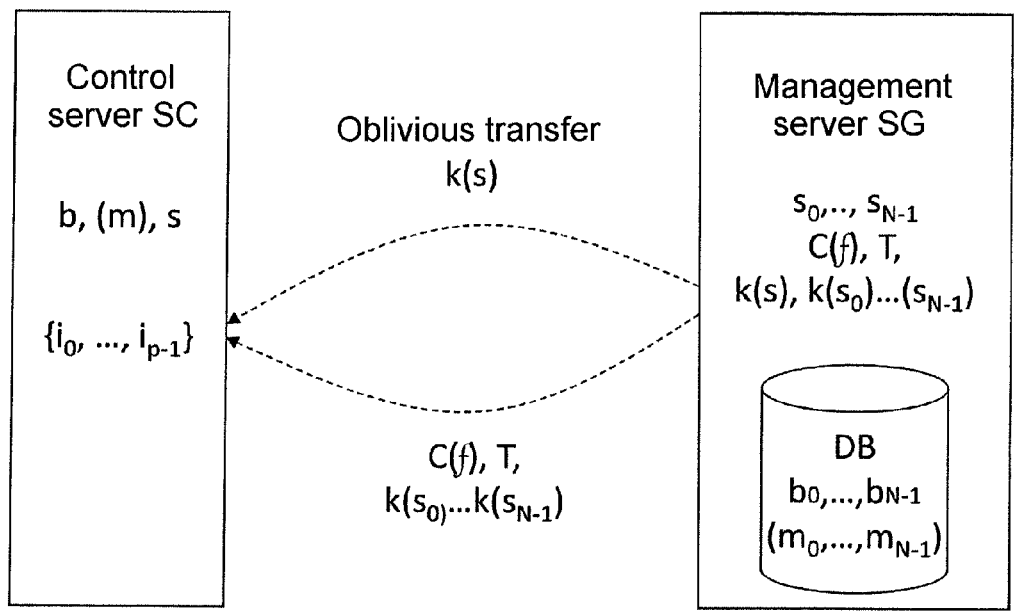
FIG. 5 illustrates an embodiment of the rapid filtering step.
Figure 6:
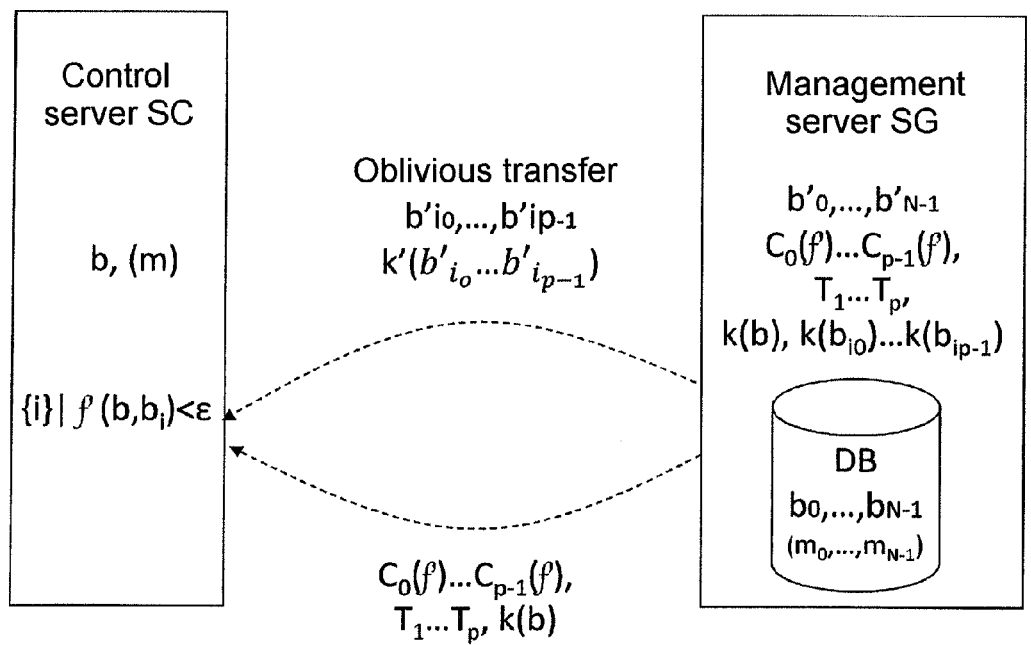
FIG. 6 illustrates the execution of the comparison and selection step of previously filtered data.

The mask codes m and $m_i$ have been shown in parentheses in FIGS. 1, 5 and 6, since they are optional, typically being used only in the event where the identification process is done on the basis of an iris datum.

In the same way, from the image of the iris acquired from the individual I, the control server generates a mask code m corresponding to the visible part of the iris.

These types of data generally contain lots of information, and are typically coded in a format of 256 octets, or 2048 bits. Hereinbelow the number of bits of data b and $b_i$ is named n.

Figure 2:
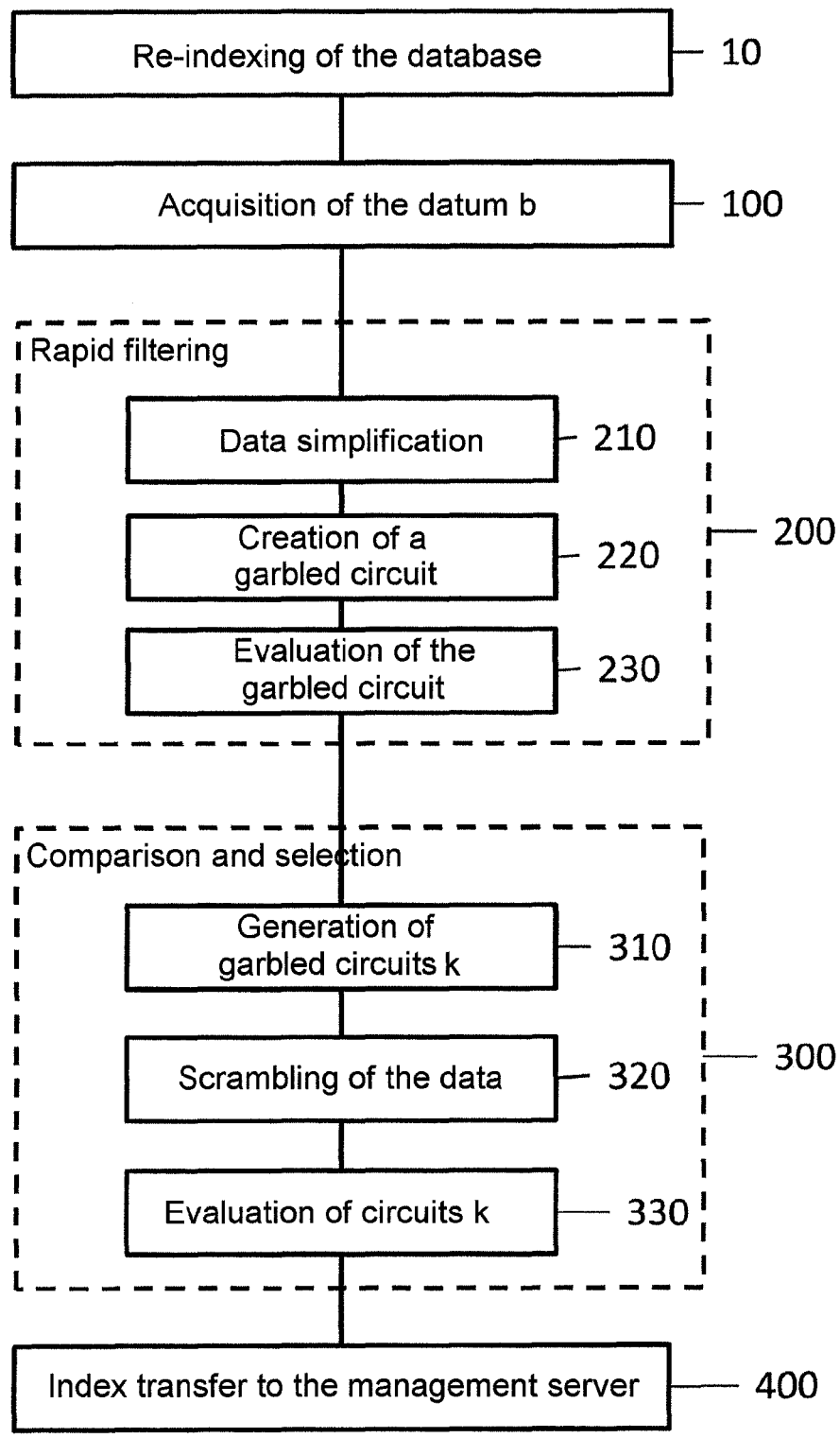
FIG. 2 illustrates the principal steps of an embodiment of the invention.

An embodiment of an identification process will now be described in reference to FIG. 2.

Before each identification process, the management server SG randomly reindexes the set of data $b_i$ from the base (step 10) so that the control server SC can store no information on the history of the identifications and their correspondences with the biometric data used for the latter.

During a step 100, the control server SC proceeds with acquisition of the datum b of the individual. Then, it initiates a first rapid filtering step 200 of the N biometric data of the base, identifying the p data, p being less than N and fixed in advance by the servers SC and SG, having the greatest similarities to b.

Rapid Filtering

To minimise the computational time for this step, the control server SC and the data server SG simplify the data b and $b_0$ to $b_{N-1}$, typically by reducing the size of these data during a step 210.

By way of example, in the event where the data are iris images coded on 2048 bits, the servers SC and SG can reduce the sizes of the data to 128 bits. To achieve this, the servers SC and SG can agree on an indexation set A which is a sub-set of set $\{1, \ldots, n\}$, such that the bits of data b and $b_i$ indexed by the elements of A are among the most significant of the data. The cardinal of A is named t, t being less than n. In the case of the example hereinabove, n is 2048 and t is 128.

The servers SG and SC generate simplified data s and $s_i$, i being between 0 and N−1, these data comprising respectively the bits of b and $b_i$ indexed by A, such that the data s and $s_i$ are coded on t bits instead of n initially.

With these simplified data, the servers SC and SG can run N comparison operations of 1:1 between s and each of the $s_i$, i being between 0 and N−1, for identifying the p simplified data $s_i$ of the base DB the closest to s. The mathematical functions of comparison of biometric data are known by those skilled in the art.

In the event where the data are iris images, it is possible to calculate a Hamming distance $D_i$ for example between s and each of the $s_i$, the Hamming distance being the number of incoherent bits between the two compared data. A similar filtering technique is described in the document F. Hao, J. Daugman, and P. Zielinski. "*A fast search algorithm for a large fuzzy database*". IEEE Transactions on Information Forensics and Security, 3(2), 2008.

The p data the closest to s are in this case the p data having the smallest Hamming distances from s.

The filtering step is conducted securely, that is, such that the servers SG and SC obtain no information on the data of the others, respectively the biometric datum b of the individual or those $b_i$ of the base.

To do so, a method of secure multi-party computation may be used, utilising the Yao protocol described hereinbelow in the description of the securing of the filtering step in reference to FIG. 5.

First, it is necessary to explain two prerequisites employed in the Yao protocol: oblivious transfers and garbled circuits.

Oblivious Transfers

The Yao protocol uses oblivious transfers, which are computation operations between two parties P1 and P2.

In this type of operation, P1 has a list of N indexed elements $X_i$, and P2 knows the number N of elements of the list and selects an index i between 0 and N−1. Via oblivious transfer, P2 recovers the $i^{st}$ element of P1, that is, the element of P1 indexed by i.

P1 learns no information on the index of the element recovered by P2.

P2 per se retrieves no information on the other elements of the list held by P1.

Garbled Circuits

The Yao protocol also uses garbled circuits. FIG. 3 illustrates an embodiment of such a garbled circuit.

Figures 3A, 3B, 3C, 3D, 3E:
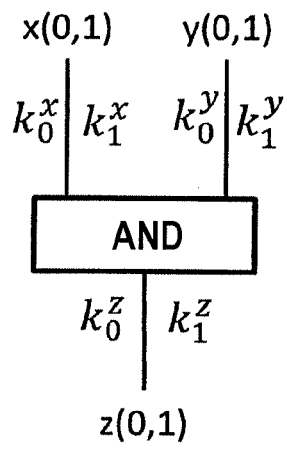
FIG. 3a illustrates a garbled circuit of the type used in the process according to the invention, on the example of a logical <<AND>> function to be evaluated.
FIGS. 3b to 3e illustrate the way in which truth tables of a garbled circuit are encrypted on the example of the truth table of the logical <<AND>> function.

In short, a garbled circuit, a diagram of which is illustrated by way of example in FIG. 3a, is an encrypted binary circuit obtained from a base binary computation circuit of a function to be evaluated, this circuit being decomposed in a succession of elementary logic gates. The diagram of the binary circuit illustrated in FIG. 3a comprises only the elementary function <<AND>>, comprising two inputs x and y, each able to take the binary value 0 or 1, and an output z, also able to take the binary value 0 or 1.

Conventionally, each logic gate is attributed with a truth table, setting up the logic link between the outputs and the inputs. The truth table of the logic function <<AND>> is illustrated by way of example in FIG. 3b.

To ensure securing of the evaluation of the function, each possible input and each output of each elementary logic gate are encrypted by the creator of the garbled circuit, by means of random pairs of encryption keys corresponding to the two possible Boolean values, particular to each input or output. In FIG. 3c for example the binary values 0 and 1 which x can take are replaced by corresponding keys $k_0^x$ and $k_1^x$, and similar for the values taken by y and z.

This produces a truth table where the binary values of inputs and outputs are replaced by encryption keys.

The outputs of each logic gate are then encrypted by the encryption keys by the values of the corresponding inputs to obtain an encrypted or garbled truth table in FIG. 3d.

So for example, in the case of the function AND, the encryption key $k_0^z$ corresponding to the value 0 of z appears in all cases where x and y are not equal to 1. However, this key $k_0^z$ is not encrypted in the same way according to the values taken by x and y: in fact, if x and y are both 0, the key $k_0^z$ is encrypted by means of the keys $k_0^x$ and $k_0^y$: this encrypted key is noted $Enc_{k_0^x, k_0^y}(k_0^z)$.

Finally, the input keys are removed from the table, and the keys obtained for each output are reordered randomly as in FIG. 3e, the resulting encrypted and scrambled truth table is actually what is called the garbled circuit.

To evaluate the function of the circuit from the encryption keys, a correlation table T between the encryption keys of the result of the function evaluated and the corresponding values of the bits is generated by the creator of the circuit.

Yao Protocol

Finally, the Yao protocol is a method of secure computation in which several parties want to make a computation from data which they have, without sharing the nature of these data with each other.

To achieve this, one of the parties creates a garbled computation circuit of a function to be evaluated, as described hereinabove, as well as pairs of encryption keys (one for the binary value 0 and one for the binary value 1) for each of the bits of inputs and outputs of the logic gates of the circuit. The creator of the garbled circuit also generates a correlation table T from the encryption keys of the result of the function and the result itself.

The creator of the garbled circuit then sends the other party (or other parties) the garbled circuit, the correlation table, and the encryption keys of the bits of the input data belonging to the creator.

In this way, for each input bit x of the creator of the circuit equal to 0 (respectively 1), the creator sends only the encryption key $k_0^x$ (resp. $k_1^x$). As these keys are random, the users of the garbled circuit can obtain no information on the corresponding bits of the data kept by the creator.

Also, users of the garbled circuit recover from the creator, by oblivious transfer, the keys corresponding to the bits of the input data of the function which they have.

Therefore, for each input bit y of the user, the creator prepares a list with two elements composed of $k_0^y$ and $k_1^y$ and the index selected by the user for oblivious transfer is the value of the bit y.

The recourse to the oblivious transfer method lets the creator get no information on the values of the bits of the data of the users of the circuit.

Finally, the user of the garbled circuit can evaluate the function by means of the keys he has obtained, and translate the result he gets at output of the function by means of the correlation table. He can optionally send the result to the creator of the circuit.

In reference again to the rapid filtering step 200, to execute filtering of the simplified biometric data $s_i$ of the base, the control servers SC and management servers SG use the Yao protocol for the secure computation of a filtering function the constitutive elements of which are illustrated in FIG. 4. The conducting of this step is represented diagrammatically in FIG. 5.

During a step 220 the management server SG creates a garbled circuit C representing a function f (noted C(f) in FIG. 5) which performs both the computation of the Hamming distance between two data, and the comparisons of the Hamming distances to identify the minimal p distances.

The computation function of the Hamming distance is known by those skilled in the art. It is noted in $D_i = \|(s \oplus s_i)\|$.

Figure 4A:
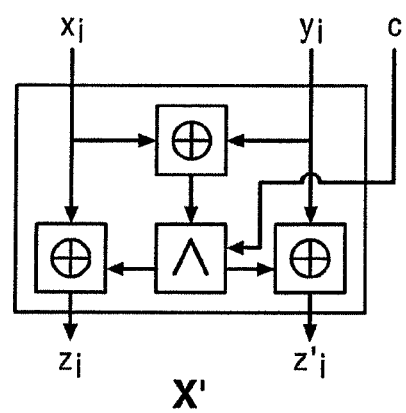
FIG. 4 illustrates an example of a comparison function used in the rapid filtering step.
Figure 4B:
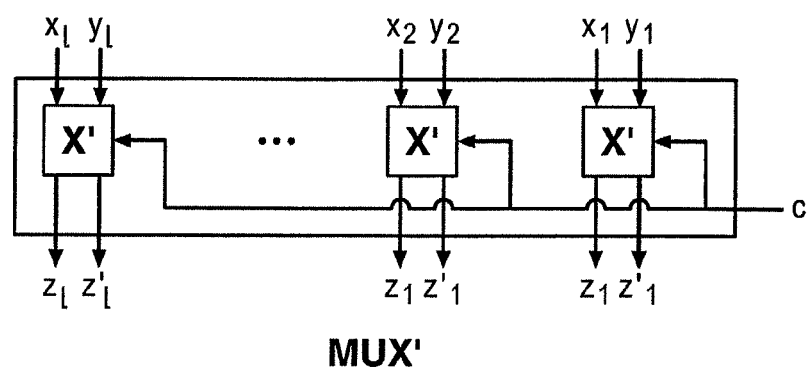

The Hamming distances calculated in this way are compared to each other by the logical operations illustrated in FIG. 4d. These operations comprise sub-functions illustrated in FIGS. 4a, 4b and 4c.

In FIG. 4a, the function X' is a function comprising three input bits, $x_i$, $y_i$, and c, and generates at output $(x_i, y_i)$ if c is 0, and $(y_i, x_i)$ if c is 1. This function X' is generalised in FIG. 4b to a function MUX' whereof the inputs are data comprising a plurality of input bits $x_i$, $y_i$.

FIG. 4c illustrates a comparison function called <<2-1>>. For inputs it has two Hamming distances, in this case noted $D_0$ and $D_1$ for comparison of the simplified data $s_0$ and $s_1$ with the datum s of the individual. At output, it gives the minimal Hamming distance between the two compared.

To do this it uses a comparison function <<>>> whereof the output (1 if $D_0$ is greater than $D_1$ and 0 if not) is the input c of a consecutive function MUX'.

Finally, in reference to FIG. 4d the general comparison function of the Hamming distances $D_i$ implements a traditional sorting method in which all distances are compared to each other in pairs at the successive level of cases <<2-1>>, the minimal distances of a first level being the inputs of the comparisons of the following level.

At the end of this logical diagram the minimal distance $D_{min}$ is obtained from the compared N distances. This comparison step is iterated p times, each time excluding the minimal distance identified at the preceding step, to finally obtain the minimal p distances $D_i$.

Once the garbled circuit C is generated, the management server SG creates the encryption keys from each of the inputs of the function f, as well as the encryption keys of the outputs of each elementary logical operation of the function f, the outputs of a logical operation being the inputs of a subsequent logical operation. It generates in particular a pair of encryption keys for each bit of each simplified datum s and $s_i$.

Finally, the management server SG generates a correlation table T but, contrary to conventional Yao protocols, this correlation table does not relate to the keys of outputs of the evaluated function, but to the outputs from comparison steps <<>>> of the Hamming distances of each operation <<2-1>>.

The management server SG sends the control server SC the garbled circuit C, the correlation table T, and the encryption keys of the bits of the simplified biometric data $s_i$, of the base DB, noted, for each bit u of each datum $s_i$, $k^0(s_i^u)$ or $k^1(s_i^u)$ according to the value of the bit u. The set of encryption keys is noted more simply $k(s_0), \ldots k(s_{N-1})$ in FIG. 5.

Also, by oblivious transfer, the control server SC retrieves the encryption keys k(s) of the bits of the simplified biometric datum of the individual s.

During a step 230 the control server SC can evaluate the comparison function between the simplified data $s_i$ of the base and the simplified datum s of the individual by means of the garbled circuit C and of keys k, to identify the p data $s_i$, having the most similarities to the datum s of the individual.

Since the control server SC has only the correlation table T of the keys of the outputs of the comparison steps <<>>>, the result it gets is not the value of the different Hamming distances, which where appropriate would provide it with information on the data, but the index of the selected p data $si_0 \ldots si_{p-1}$.

On completion of this filtering step, the server SC knows only the list $\{i_0, \ldots, i_{p-1}\}$ of the indices of the p simplified data $\{s_{i0}, \ldots, s_{ip-1}\}$ having the minimal Hamming distances with the datum s of the individual such that the control server SC learns no information on the selected simplified data $\{s_{i0}, \ldots, s_{ip-1}\}$ and a fortiori on the data of the corresponding base $\{b_{i0}, \ldots, b_{ip-1}\}$.

The management server SG thus has obtained no information on the simplified biometric datum s of the individual and a fortiori on the original datum b.

Comparison and Selection

The comparison and selection step 300 is run on the data $b_{i_j}$, j being between 0 and p-1, corresponding to the simplified data $s_{i_j}$ identified during the rapid filtering step 200. Its aim is to determine, from the p simplified data closest to the biometric datum of the individual, whether there is one or more data whereof the similarities to the datum of the individual exceed a predetermined threshold η.

As is known by those skilled in the art, this threshold is selected to set up the correspondence of biometric data with optimal rates of false positives and false negatives.

Similarly to the Yao protocol, the management server SG creates, during a step 310, p garbled circuits C0 . . . Cp-1, each being used to evaluate a comparison function f' with a biometric datum $b_{i_j}$ selected previously, (j being between 0 and p-1) and its corresponding mask $m_{i_j}$, using only the corresponding scrambled data.

The comparison function f' utilised in comparison and selection step 300 is separate from the function f utilised for the filtering 200.

In the event where the biometric data are iris images, the comparison function f' can be the normalized Hamming distance, that is, the Hamming distance calculated on 2048-bit codes, and taking into account the masks associated with the iris images, that is, the codes indicating the zones of the iris which are masked, typically by an eyelid, and which are therefore not relevant for comparison.

For more information on the normalized Hamming distance reference can be made to the Daugman method described in the document J. Daugman, <<How Iris Recognition Works>> IEEE transactions on circuits and systems for video technology, Vol. 14, No. 1, JANUARY 2004.

If X and Y are noted as two iris images coded on 2048 bits, and m(X) and m(Y) their associated masks, the normalized Hamming distance is $$HD(X, Y) = \frac{\|(X \oplus Y) \cap m(X) \cap m(Y)\|}{\|m(X) \cap m(Y)\|}.$$

The aim of this step is therefore to calculate $f(b, b_{i_j})=HD(b, b_{i_j})$ for all the data $b_{i_j}$ previously selected during the rapid filtering step, and keep that data for which HD (b, $b_{i_j}$)<ϵ, where ϵ is a predetermined threshold for comparison of the Hamming distances. Of course, the similarity threshold η which the comparisons must exceed is inversely proportional to the threshold ϵ in the case of comparison by computation of the Hamming distances, since the latter enumerate the dissimilarities between the data and not the similarities.

To optimise computation, the circuits $C_j$, j being between 0 and p-1, are preferably built to make the comparison $\|(X \oplus Y) \cap m(X) \cap m(Y)\| < \epsilon \|m(X) \cap m(Y)\|$, and not $$\frac{\|(X \oplus Y) \cap m(X) \cap m(Y)\|}{\|m(X) \cap m(Y)\|} < \epsilon.$$

For each circuit $C_j$ the management server SG also generates the encryption keys k of the inputs and outputs of each logic gate, in particular comprising a pair of encryption keys for each input bit of the function to be evaluated, that is, for each input bit of the datum b and the data of the base $b_i$, as well as the correlation table T of the output keys of the function.

The management server SG sends the control server SC the garbled circuits $C_j$ and the respective correlation tables $T_j$ of the circuits.

The control server SC retrieves the encryption keys of the bits of the biometric datum b of the individual I by oblivious transfer and for each garbled circuit.

The control server SC must finally retrieve the values of the data $bi_j$ of the base which have been selected, as well as the corresponding keys so they can be compared to the datum b of the individual, without learning any information on these data.

For this to happen, the management server SG first scrambles the set of data $b_i$, during a step 320, to obtain the scrambled data $b'_i$.

More precisely, for each of the p reference data $b_{i_0}, \ldots, b_{i_{p-1}}$ corresponding to the selected simplified data $s_{i_0}, \ldots, s_{i_{p-1}}$, and for each possible position u of a bit in the binary representation of this datum, the management server SG generates a random permutation $\tau_u^{ij}$ of $\{0,1\}$, and applies said random permutation $\tau_u^{ij}$ to the bit of said position u of each of the N data $b_i$ of the base to create p bases of scrambled data corresponding to the initial data (bi) of the base. These bases can be noted $DB^{ij} = \{b^{0,ij}, \ldots, b^{N-1,ij}\}$, where for any u between 1 and n, and for any k between 0 and N−1, $b_u^{k,ij} = \tau_u^{ij}(b_u^k)$.

The $\{0,1\}$ permutation can have only two results on the bits of the data $b_i$: either it converts the binary values of the bits (1, 0) in their opposite (0, 1) or it keeps the values of the bits.

In the same way the management server can scramble the masks $m_i$ to create scrambled masks $m'_i$.

Through oblivious transfer, the control server SC retrieves the scrambled data $b'_{i_j,i_j}$, that is, the data of index $i_j$, j between 0 and p−1, and scrambled by the respective permutations of indices $i_j$. Noted is $b'_{i_j}$ the scrambled data corresponding to the selected data $b_{i_j}$. Other scrambling methods are feasible.

The control server gets no information on the selected data and the management server SG gets no information on the index of these data.

Next, for the control server to be able to evaluate the garbled circuit with the scrambled data $b'_{i_j}$, the management server scrambles the corresponding encryption keys.

The encryption keys generated by the management server SG for a bit u of a datum $b_i$ of the base are noted respectively $k^0(b_i^u)$ and $k^1(b_i^u)$) as a function of the binary value of the bit u.

For a bit of a scrambled datum $b'^u_{i_j}$, the corresponding scrambled keys are $$k'^0(b'^u_{i_j}) = k^{\tau_u^{ij}(0)}(b^u_{i_j}) \text{ and } k'^1(b'^u_{i_j}) = k^{\tau_u^{ij}(1)}(b^u_{i_j}),$$

as a function of the binary value, 0 or 1 of the bit u. With these encryption keys the control server SC can perform computations from the scrambled functions since there is the relation $k'(b'^u_{i_j}) = k(b^u_{i_j})$.

The management server retrieves finally, by oblivious transfer, the encryption keys $k'^0(b'^u_{i_j})$ or $k'^1(b'^u_{i_j})$, (noted more simply in FIG. 6 $k'(b'i_0 \ldots b'i_{p-1})$) for each of the bits of each of the scrambled biometric data, as a function of the respective binary values of these bits.

It finally evaluates the function during a step 330 from the encryption keys obtained, outputting the fact that the biometric datum $bi_j$ corresponding to the scrambled datum $b'_{i_j}$ corresponds or not to b beyond the predetermined threshold η.

A the issue of the set of evaluations made on the garbled circuits $C_j$ the control server SC has the index i of the biometric datum $b_i$ stored in the base which corresponds to the datum of the individual, if it exists. The server can also have several indices, if several data of the base correspond to that of the individual I.

The control server SC communicates the obtained index $i_{ID}$ to the management server SG during a step 400, the management server SG which identifies the biometric datum $b_{ID}$, and the corresponding individual stored, which has been identified as the individual I.

If the identification system is placed upstream of a zone with controlled access, for example, the control server SC or the management server SG can authorize access of the individual I to the zone, or not.

Therefore the process according to the invention enables faster identification than processes proposed to date, due to the rapid filtering step performed on simplified biometric data.

Yet it remains quite safe, due to the step for scrambling selected data after the rapid filtering step.

The invention claimed is:

1. An identification process of an individual or object (I), in a system comprising a control server (SC) and a management server (SG) of a database (DB) comprising N indexed reference data ($b_i$) of N stored individuals, each of the datum (b) of the individual (I) and the reference data ($b_i$) comprising a set of n indexed bits, the process comprising steps during which:

the control server (SC) acquires (100) the datum (b) of the individual or object to be identified the control server (SC) and the management server (SG) convert (210) the reference data ($b_i$) of the base and the datum (b) of the individual or object (I) to be identified into simplified data ($s_i$, s), the simplified data ($s_i$, s) being coded on t bits, t being less than n, the conversion comprising defining of an indexation set comprising indexing numbers of the bits of each of the datum of the individual and of the reference data, said indexing numbers being selected to relate to the most pertinent bits of the datum of the individual and the reference data, and generating a simplified datum from the datum of the individual or a reference datum as comprising only the bits of the datum that are indexed by the indexing numbers of the indexation set, the control server (SC) determines (200) a set of p index ($i_0, \ldots, i_{p-1}$) of simplified data ($s_{i_0}, \ldots, s_{i_{p-1}}$) of the base (DB), p being less than N, having the most similarities to the simplified datum (s) of the individual or object (I) to be identified, securely between each of the N simplified data ($s_i$) of the database (DB) and the simplified datum (s) of the individual or object (I) to be identified, said set being determined by performing a method of secure multi-party computation in which the management server (SG) generates (220) a garbled computation circuit of a function to be evaluated, the garbled circuit having for inputs a set of encryption keys of all the bits of the simplified data ($s_{i_0}, \ldots, s_{i_{p-1}}$) of the base (DB) and those of the simplified datum (s) of the individual (I), the function to be evaluated being the calculation of the rates of similarities between the simplified data ($s_{i_0}, \ldots, s_{i_{p-1}}$) of the base (DB) and the simplified datum (s) of the individual (I) followed by a search step of the simplified p data of the base having the most similarities to the simplified datum (s) of the individual, the evaluation of the circuit allowing finding the index $(i_0, \ldots, i_{p-1})$ of the simplified data $(s_{i_0}, \ldots, s_{i_{p-1}})$ having the most similarities to the simplified datum (s) of the individual, the management server (SG) scrambles (320) the N reference data ($b_i$) of the database (DB), and transfers to the control server p scrambled data ($b'_{i_0}, \ldots, b'_{i_{p-1}}$) corresponding to the simplified data ($s_{i_0}, \ldots, s_{i_{p-1}}$) identified previously, from the p scrambled data ($b'_{i_0}, \ldots, b'_{i_{p-1}}$) the control server (SC) determines (300), by secure multi-party computation between each of the p scrambled data ($b'_{i_0}, \ldots, b'_{i_{p-1}}$) and the datum (b) of the individual or object, the index or the indices ($i_{ID}$) of one or more scrambled data ($b'_{i_{ID}}$) whereof the corresponding reference data ($b_{i_{ID}}$) have a rate of similarity to the datum (b) of the individual or object, which exceeds a predetermined threshold ($\eta$), in which each step of secure multi-party computation comprises the following sub-steps:

the management server (SG) generates at least one garbled circuit (C) for computation of a function (f) to be evaluated, each garbled circuit (C) having for inputs a set of encryption keys of bits of input data of the function (f) to be evaluated and for output the encryption keys corresponding to the bits of the result of the evaluated function (f), and comprising:

the computation steps of the function (f) decomposed in the form of elementary logical operations, and a set of coding keys (k) of each of the possible inputs and outputs of each elementary logical operation, the management server (SG) randomly generates said coding keys (k), the management server (SG) communicates to the control server (SC), using an oblivious transfer technique, for each garbled circuit (C), coding keys (k) corresponding to the values of the bits of the inputs of the function (f) to be evaluated, and decoding table (T) of the output of each garbled circuit (C) or of one or more outputs of a logical operation of the latter, and from the keys (k) obtained, the control server (SC) evaluates each garbled circuit (C) using the keys obtained as input, and in which: for scrambling the N data of the base, the management server generates, for each of the p reference data corresponding to the simplified data selected, a corresponding scrambled database comprising N scrambled data for which, for each possible position of a bit in the binary representation of the corresponding data, a random permutation is applied to the bit of said position, and the generation of the coding keys (k') of a scrambled datum ($b'_{i_j}$) is performed by applying to randomly-generated coding keys (k) for each bit of the ($b_{i_j}$) corresponding datum of the base, a reindexation according to the same permutation ($\tau_u^{ij}$) as that applied to said bit of the datum ($b_{i_j}$) to obtain the scrambled datum ($b'_{i_j}$).

2. The identification process according to claim 1, in which the transfer of p scrambled data ($b'_{i_0}, \ldots, b'_{i_{p-1}}$) from the management server (SG) to the control server (SC) uses an oblivious transfer technique.

3. The identification process according to claim 1, in which, after the control server (SC) has determined the index or the indices ($i_{ID}$) of the scrambled data ($b'_{i_{ID}}$) whereof the corresponding reference data ($b_{i_{ID}}$) have a rate of similarity to the datum (b) of the individual (I) or object which exceeds a predetermined threshold ($\eta$), the control server (SC) communicates (400) said index ($i_{ID}$) to the management server (SG), and from the index or indices ($i_{ID}$), the management server (SG) determines the reference datum or the reference data ($b_{i_{ID}}$) of the base corresponding to said index or said indices, and identifies the individual (i) or object as an individual or object stored in the base (DB) having the reference datum ($b_{i_{ID}}$) corresponding to the index or the indices ($i_{ID}$).

4. The identification process according to claim 1, in which, for scrambling the N data ($b_i$) of the base (DB), the management server (SG) generates, for each of the p reference data ($b_{i_j}$) corresponding to the simplified data selected ($s_{i_j}$), a corresponding scrambled database ($DB^{ij}$) comprising N scrambled data ($b'_i$) for which, for each possible position (u) of a bit in the binary representation of the corresponding data ($b_i$), a random permutation ($\tau_u^{ij}$) is applied to the bit of said position (u).

5. The identification process according to claim 1, in which the identification relates to an individual, and the reference data ($b_i$) of the base (DB) and the datum (b) of the individual (I) to be identified are biometric data.

6. The identification process according to claim 5, in which the biometric data (b, $b_i$) are binary codes of iris images.

7. The identification process according to claim 1, in which the determining of simplified data ($s_i$) of the base (DB) having the most similarities to the simplified datum (s) of the individual (I) or object is performed by computation of Hamming distances between the simplified data ($s_i$) of the base (DB) and the simplified datum (s) of the individual.

8. The identification process according to claim 1, in which the determination step of N simplified data ($s_i$) of the base (DB) having the most similarities to the simplified datum (s) of the individual (I) to be identified is performed by secure multi-party computation.

9. The identification process according to claim 1, in which, during the step of secure multi-party computation between the scrambled data ($b'_{i_0}, \ldots, b'_{i_{p-1}}$) of the base (DB) and the datum (b) of the individual, a rate of similarity between each datum of the base ($b_{i_0}, \ldots, b_{i_{p-1}}$) corresponding to each scrambled datum ($b'_{i_0}, \ldots, b'_{i_{p-1}}$) and the datum of the individual (b) is calculated, the rate of similarity obtained is compared to the predetermined threshold ($\eta$) to select the index or the indices of the datum or the data of the base (DB) having a rate of similarity exceeding said threshold ($\eta$).

10. The identification process according to claim 1, in which, to compute and compare the rate of similarity between the data ($b_{i_0}, \ldots, b_{i_{p-1}}$) corresponding to the scrambled data ($b'_{i_0}, \ldots, b'_{i_{p-1}}$) and the datum (b) of the individual, a secure multi-party computation is made, in which for each of the data of the selected base the management server (SG) generates (310) a corresponding garbled circuit, the inputs of each garbled circuit ($C_0 \ldots C_{p-1}$) being encryption keys of the corresponding scrambled datum ($b'_{i_0}, \ldots, b'_{i_{p-1}}$) and those of the datum (b) of the individual (I), the function (f) to be evaluated of each garbled circuit being the calculation of the rate of similarity between the datum of the corresponding base ($b_{i_0}, \ldots, b_{i_{p-1}}$) and the datum (b) of the individual, and comparison of the rate of similarity to the predetermined threshold ($\eta$), and the output of each circuit ($C_0 \ldots C_{p-1}$) being the result of comparison of the rate of similarity to the predetermined threshold ($\eta$), in which the management server (SG) generates and transfers to the control server (SC), for each garbled circuit ($C_0 \ldots C_{p-1}$), scrambled coding keys (k') corresponding to the possible values of the bits of the scrambled datum ($b'_{i_0}, \ldots, b'_{i_{p-1}}$) and coding keys (k) corresponding to the possible values of the bits of the datum (b) of the individual, and transfers to the control server (SC) the values of the bits of the scrambled datum, and in which the transfers of the values of the bits of the scrambled datum and the corresponding coding keys execute an oblivious transfer method.

11. The identification process according to claim 10, in which the function (f) to be evaluated of each garbled circuit ($C_0 \ldots C_{p-1}$) comprises computation of the normalized Hamming distance between each datum ($b_{i_0}, \ldots, b_{i_{p-1}}$) corresponding to the scrambled datum ($b'_{i_0}, \ldots, b'_{i_{p-1}}$) and the datum (b) of the individual (I).

12. The identification process according to claim 1, comprising a preliminary step (10) during which the data ($b_0 \ldots b_{N-1}$) of the base (DB) are reindexed randomly by the management server (SG).

13. An identification system of an individual, comprising at least one control server (SC) of an individual (I) to be identified, and at least one management server (SG) of a base (DB) of N reference data ($b_0 \ldots b_{N-1}$) of stored individuals, the control server (SC) being adapted to proceed with acquisition of a datum (b) of the individual (I), wherein the control server (SC) and the management server (SG) comprise processors adapted for the steps during which:

the control server (SC) and the management server (SG) convert (210) the reference data ($b_i$) of the base and the datum (b) of the individual or the object (I) to be identified into simplified data ($s_i$, s), the simplified data ($s_i$, s) being coded on t bits, the control server (SC) determines (200) a set of p index ($i_0, \ldots i_{p-1}$) of simplified data ($s_{i_0}, \ldots, s_{i_{p-1}}$) of the base (DB), p being less than N, having the most similarities to the simplified datum (s) of the individual or object (I) to be identified, securely between each of the N simplified data ($s_i$) of the database (DB) and the simplified datum (s) of the individual or object (I) to be identified, said set being determined by performing a method of secure multi-party computation in which the management server (SG) generates (220) a garbled computation circuit of a function to be evaluated, the garbled circuit having for inputs a set of encryption keys of all the bits of the simplified data ($s_{i_0}, \ldots, s_{i_{p-1}}$) of the base (DB) and those of the simplified datum (s) of the individual (I), the function to be evaluated being calculation of the rates of similarities between the simplified data ($s_{i_0}, \ldots, s_{i_{p-1}}$) of the base (DB) and the simplified datum (s) of the individual (I) followed by a search step of p simplified data of the base having the most similarities to the simplified datum (s) of the individual, the evaluation of the circuit finding the index ($i_0, \ldots, i_{p-1}$) of the simplified data ($s_{i_0}, \ldots, s_{i_{p-1}}$) having the most similarities to the simplified datum (s) of the individual, the management server (SG) scrambles (320) the N reference data ($b_i$) of the database (DB), and transferring p scrambled data ($b'_{i_0}, \ldots, b'_{i_{p-1}}$) corresponding to the simplified data ($s_{i_0}, \ldots, s_{i_{p-1}}$) identified previously, from p scrambled data ($b'_{i_0}, \ldots, b'_{i_{p-1}}$), the control server determining (300), by secure multi-party computation between each of the p scrambled data ($b'_{i_0}, \ldots, b'_{i_{p-1}}$) and the datum (b) of the individual or object, the index or the indices ($i_{ID}$) of one or more scrambled data ($b'_{i_{ID}}$) whereof the corresponding reference data ($b_{i_{ID}}$) have a rate of similarity to the datum (b) of the individual or object which exceeds a predetermined threshold ($\eta$), without the control server (SC) obtaining any information on the reference data ($b_0 \ldots b_{N-1}$) stored in the database (DB), or the management server (SG) obtaining any information on the datum (b) of the individual (I) to be identified, and in which: for scrambling the N data of the base, the management server generates, for each of the p reference data corresponding to the simplified data selected, a corresponding scrambled database comprising N scrambled data for which, for each possible position of a bit in the binary representation of the corresponding data, a random permutation is applied to the bit of said position, and the generation of the coding keys (k') of a scrambled datum ($b'_{i_j}$) is performed by applying, to randomly-generated coding keys (k) for each bit of the ($b'_{i_j}$) corresponding datum of the base, a reindexation according to the same permutation ($\tau_u^{i_j}$) as that applied, to said bit of the datum ($b_{i_j}$) to obtain the scrambled datum ($b'_{i_j}$).

14. An identification process of an individual or object (I), in a system comprising a control server (SC), and a management server (SG) of a database (DB) comprising N indexed reference data ($b_i$) of N stored individuals, each of the datum (b) of the individual (I) and the reference data ($b_i$) comprising a set of n indexed bits, the process comprising steps during which:

the control server (SC) acquires (100) the datum (b) of the individual or object to be identified, the control server (SC) and the management server (SG) convert (210) the reference data ($b_i$) of the base and the datum (b) of the individual or object (I) to be identified into simplified data ($s_i$, s), the simplified data ($s_i$, s) being coded on t bits, t being less than n, the control server (SC) determines (200) a set of p index ($i_0, \ldots, i_{p-1}$) of simplified data ($s_{i_0}, \ldots, s_{i_{p-1}}$) of the base (DB), p being less than N, having the most similarities to the simplified datum (s) of the individual or object (I) to be identified, securely between each of the N simplified data ($s_i$) of the database (DB) and the simplified datum (s) of the individual or object (I) to be identified, said set being determined by performing a method of secure multi-party computation in which the management server (SG) generates (220) a garbled computation circuit of a function to be evaluated, the garbled circuit having for inputs a set of encryption keys of all the bits of the simplified data ($s_{i_0}, \ldots, s_{i_{p-1}}$) of the base (DB) and those of the simplified datum (s) of the individual (I), the function to be evaluated being calculation of the rates of similarities between the simplified data ($s_{i_0}, \ldots, s_{i_{p-1}}$) of the base (DB) and the simplified datum (s) of the individual (I) followed by a search step of p simplified data of the base having the most similarities to the simplified datum (s) of the individual, the evaluation of the circuit finding the index $(i_0, \ldots, i_{p-1})$ of the simplified data $(s_{i_0}, \ldots, s_{i_{p-1}})$ having the most similarities to the simplified datum (s) of the individual, the management server (SG) scrambles (320) the N reference data (bi) of the database (DB), for which the management server (SG) generates at least one garbled circuit (C) for computation of a function (f) to be evaluated, each garbled circuit (C) having for inputs a set of encryption keys of bits of input data of the function (f) to be evaluated and for output the encryption keys corresponding to the bits of the result of the evaluated function (f), and comprising:

the computation steps of the function (f) decomposed in the form of elementary logical operations, and a set of coding keys (k) of each of the possible inputs and outputs of each elementary logical operation, the management server (SG) randomly generates said coding keys (k), the management server (SG) communicates to the control server (SC), using an oblivious transfer technique, for each garbled circuit (C), coding keys (k) corresponding to the values of the bits of the inputs of the function (f) to be evaluated, and decoding table (T) of the output of each garbled circuit (C) or of one or more outputs of a logical operation of the latter, and from the keys (k) obtained, the control server (SC) evaluates each garbled circuit (C) using the keys obtained as input, and transfers to the control server p scrambled data $(b'_{i_0}, \ldots, b'_{i_{p-1}})$ corresponding to the simplified data $(s_{i_0}, \ldots, s_{i_{p-1}})$ identified previously, from p scrambled data $(b'_{i_0}, \ldots, b'_{i_{p-1}})$, the control server (SC) determines (300), by secure multi-party computation between each of the p scrambled data $(b'_{i_0}, \ldots, b'_{i_{p-1}})$ and the datum (b) of the individual or object, the index or the indices $(i_{ID})$ of one or more scrambled data $(b'_{i_{ID}})$ whereof the corresponding reference data $(b_{i_{ID}})$ have a rate of similarity to the datum (b) of the individual or object which exceeds a predetermined threshold ($\eta$), wherein the management server (SG) generates p garbled computation circuits of functions to be evaluated, the management server randomly generates for each garbled circuit a set of coding keys of the bits of the datum of the individual and of the p reference data of the base having the most similarities to the simplified datum (s) of the individual or object (I) to be identified, and the control server applies on the coding keys of the bits of the p reference data a same permutation as applied to said reference data to obtain the scrambled data $(b'_{i_j})$.

* * * * *